US010564642B2

(12) United States Patent
Ono (10) Patent No.: US 10,564,642 B2
(45) Date of Patent: Feb. 18, 2020

(54) WORK VEHICLE

(71) Applicant: ISEKI & CO., LTD, Ehime-ken (JP)

(72) Inventor: Koki Ono, Ehime-ken (JP)

(73) Assignee: Iseki & Co., LTD, Ehime-Ken (JP)

( * ) Notice: Subject to any disclaimer, the term of this patent is extended or adjusted under 35 U.S.C. 154(b) by 0 days.

(21) Appl. No.: 16/205,621

(22) Filed: Nov. 30, 2018

(65) Prior Publication Data

US 2019/0163190 A1 May 30, 2019

(30) Foreign Application Priority Data

Nov. 30, 2017 (JP) ................... 2017-230750

(51) Int. Cl.
*G05D 1/02* (2006.01)
*G05D 1/00* (2006.01)

(52) U.S. Cl.
CPC ......... *G05D 1/0214* (2013.01); *G05D 1/0088* (2013.01); *G05D 1/0246* (2013.01); *G05D 2201/0201* (2013.01)

(58) Field of Classification Search
CPC combination set(s) only.
See application file for complete search history.

(56) References Cited

U.S. PATENT DOCUMENTS 6,934,615 B2 * 8/2005 Flann ............... A01B 69/008
172/2
2018/0282973 A1 * 10/2018 Ono ....................... B60T 7/22

FOREIGN PATENT DOCUMENTS

JP 2011-62115 3/2011

* cited by examiner

*Primary Examiner* — Thomas G Black
*Assistant Examiner* — Ana D Thomas
(74) *Attorney, Agent, or Firm* — Finnegan, Henderson, Farabow, Garrett & Dunner LLP (57) ABSTRACT

A work vehicle may be provided such that in autonomous traveling, contact with obstacles is avoided, and work is efficiently and safely performed. A work vehicle may include: a positioning device 174 measuring the vehicle body's own position; an obstacle recognition means recognizing an obstacle P, E, U; and a control unit having the vehicle autonomously travel on a planned travel path R1 preliminarily set; wherein the control unit includes obstacle position information D4 preliminarily stored; while traveling on the planned travel path R1, when an obstacle P, E is recognized by the obstacle recognition means, at a position stored in the obstacle position information D4, avoidance driving is performed to avoid contact with the obstacle P, E; and when the position of an obstacle U recognized by the obstacle recognition means is different from the stored obstacle position information D4, the traveling is stopped.

3 Claims, 10 Drawing Sheets

WORK VEHICLE

CROSS REFERENCE TO RELATED APPLICATIONS

This application claims priority to Japanese Patent Application No. 2017-230750, filed Nov. 30, 2017, the disclosure of which is incorporated herein by reference in its entirety.

BACKGROUND

The present disclosure relates to a work vehicle that may be useful for performing work in a farm field while traveling therein.

In one known configuration, a work vehicle includes a cultivating machine attached to the rear of the vehicle body, and performs work while traveling in a farm field, and the work vehicle further includes a front camera checking the conditions of the road surface in the front, and an ultrasonic-wave sensor detecting the distance to an obstacle in the front. If the distance to the obstacle calculated by image recognition of the camera is substantially the same as that detected by the ultrasonic-wave sensor, a turning position is set before the detected obstacle, and the operator is notified when the work vehicle has reached the turning position, and when the turning is started, the rear wheel on the inside side of the turn is automatically braked, while the implement is automatically lifted up. See, e.g., Japanese Unexamined Patent Application Publication No. 2011-62115.

However, such a configuration is only to notify the timing for turning upon detection of an obstacle, but not to avoid it. If there is a preliminarily known obstacle, avoiding it by avoidance driving to continue work may allow for efficient work.

SUMMARY

An object of the present disclosure is to provide a work vehicle allowing for safe work, while avoiding expected obstacles. In some embodiments of the present disclosure, the following aspects may be useful to achieve the above object.

A first aspect of the disclosure relates to a work vehicle that comprises: a positioning device measuring the vehicle body's own position; an obstacle recognition means, such as an obstacle sensor, recognizing an obstacle (P, E, U); and a control unit having the vehicle autonomously travel on a planned travel path (R1) preliminarily set; wherein the control unit includes obstacle position information (D4) preliminarily stored; while traveling on the planned travel path (R1), when an obstacle (P, E) is recognized by the obstacle recognition means, at a position stored in the obstacle position information (D4), avoidance driving is performed to avoid contact with the obstacle (P, E); and when the position of an obstacle (U) recognized by the obstacle recognition means is different from the stored obstacle position information (D4), the traveling is stopped.

As a result, work may be efficiently performed while the preliminarily expected obstacles (P, E) are avoided, and for the obstacle (U) that is not preliminarily expected, in consideration of unexpected contingency, the traveling is stopped to avoid contact with the obstacle (U) in the autonomous traveling for safe work.

A second aspect of the disclosure relates to the work vehicle of the first aspect wherein the control unit includes: traveling vehicle profile information (D1), and implement profile information (D2) of the attached implement; the traveling vehicle profile information (D1) and the implement profile information (D2) include position information of the positioning device; with respect to the position (G) of the positioning device, work vehicle profile information (D5) is calculated by adding the implement profile information (D2) to the traveling vehicle profile information (D1); and according to the work vehicle profile information (D5), an avoidance path is set to avoid contact with the obstacle (P, E, U).

As a result, the work vehicle profile information (D5) that is the own shape including the profile information (D2) of the attached implement may be recognized, and therefore, even when the implements of different shapes are attached, contact with the obstacles (P, E) may be avoided in the autonomous traveling, and work may be efficiently and safely performed.

A third aspect of the disclosure relates to the work vehicle of the second aspect wherein the control unit calculates a predicted position of the work vehicle profile information (D5) of when the work vehicle autonomously travels in such a way that the position (G) of the positioning device moves along the planned travel path (R1) preliminarily set; and when the predicted position interferes with the recognized obstacle (P, E), changes the planned travel path (R1), and sets an alternative travel path (R2) in which the predicted position does not interfere with the work vehicle profile information (D5).

When the different implements are attached to the tractor, when running on the same travel trajectory (R1), the vehicle may recognize the work vehicle profile information (D5), and if contact with the obstacle (P, E) is predicted, the vehicle may travel on a new travel path (R2) by changing the travel path (R1) corresponding to the implement attached, and therefore, even when the implements of different shapes are attached, contact with the obstacles (P, E) may be avoided in the autonomous traveling, and work may be efficiently and safely performed.

In accordance with the above aspects of the disclosure, a work vehicle may be achieved in which contact with obstacles (P, E, U) in the autonomous traveling may be avoided, and work may be efficiently and safely performed.

DESCRIPTION OF EXEMPLARY EMBODIMENTS

Reference will now be made in detail to several exemplary embodiments of a work vehicle, including those illustrated in the accompanying drawings. Whenever possible, the same reference numbers will be used throughout the drawings to refer to the same or like parts.

Figure 1:
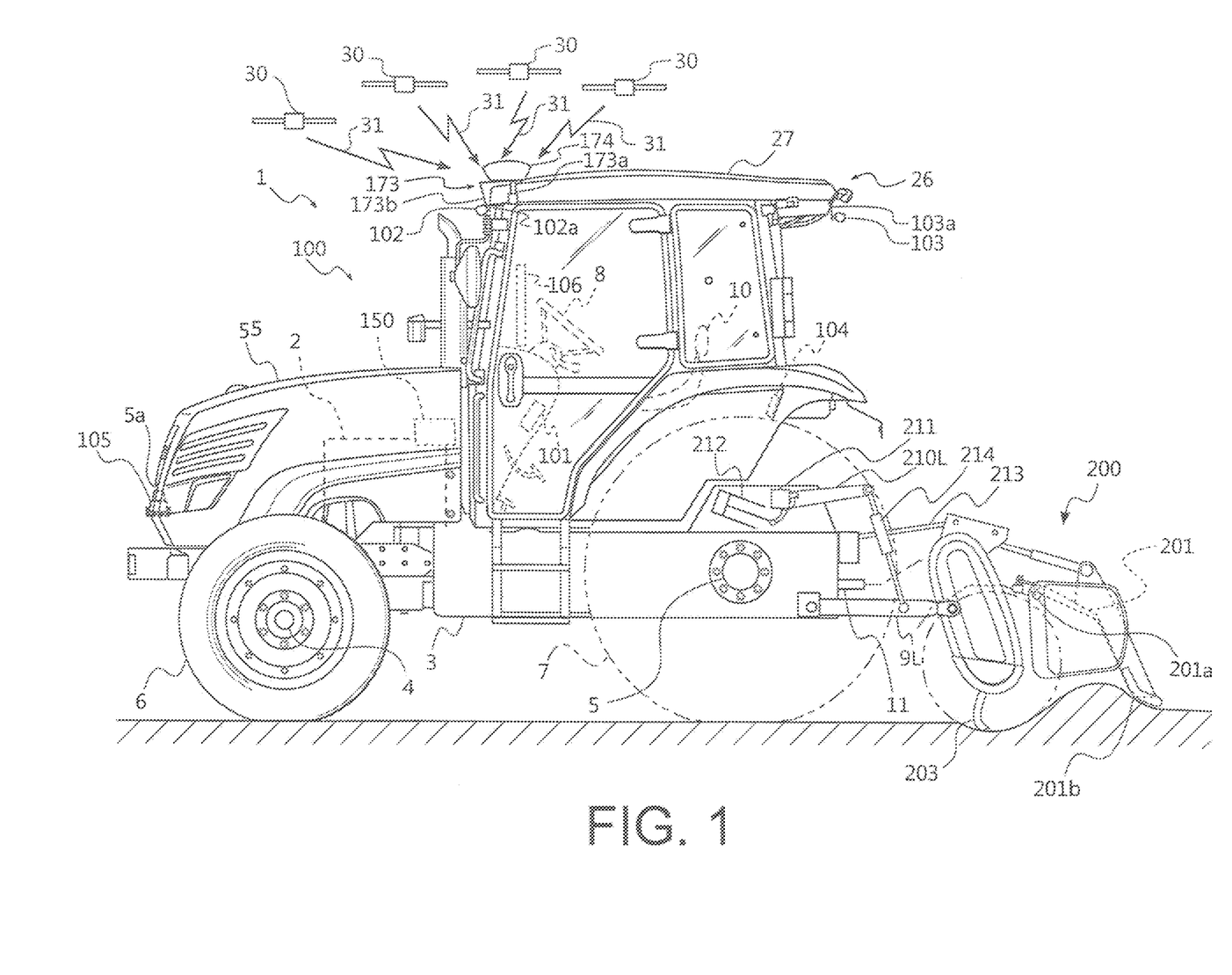
FIG. 1 illustrates a side view of a tractor according to an embodiment.

FIG. 1 illustrates an allover side view of a tractor 1 as an example of a work vehicle consistent with embodiments of the present disclosure, and the tractor 1 comprises: a vehicle body 100; an implement 200 attached to the vehicle body 100; a hood 55 provided in the front of the tractor 1, an engine 2 disposed in the hood 55; a front axle 4; a rear axle 5; front wheels 6; rear wheels 7; a transmission case 3 appropriately changing the speed of the force of the engine 2 and then transmitting to the front axle 4 and the rear axle 5 to drive the front wheels 6 and the rear wheels 7 or only the rear wheels 7; a cabin 26 provided on the machine; a seat 10 provided in the cabin 26; and a steering wheel 8, vertically disposed in the center of the cabin 26, for the operator to operate to steer the front wheels 6 for traveling. The implement 200 such as a rotary tiller is attached to lower links 9 projecting from the rear of the machine, and a power take off (PTO) shaft 11 that projects rearward from the transmission case 3 drives the attached implement 200.

The rear of the implement 200 is covered by a rear cover 201, which rotates about a rear-cover rotating shaft 201a provided in the right-left direction of the vehicle. In cultivating work, a bottom end 201b of the rear cover 201 makes contact with the ground surface and levels the soil after it is cultivated.

The implement 200 is supported at three points by the right and left lower links 9 and a top link 213, and the left lower link 9L is connected by a left lift arm 210L and an inclinable cylinder 214 that is a type of an actuator. The lift arm 210 is rotated up and down by means of a main cylinder 212, and the up-down rotation of the lift arm 210 lifts up and down the implement 200. The rotation angle of the lift arm 210 is detected by a lift arm sensor 211.

The tractor 1 may include a positioning device configured to measure a position of a body of the tractor 1. On an upper surface of a cabin roof 27, a global positioning system (GPS) antenna 174 as an example of a positioning device is provided, and the GPS antenna 174 receives a positioning signal 31 sent from a plurality of GPS satellites 30 and measures its own position. The GPS antenna 174 is attached to the cabin roof 27 by a GPS antenna stay 173 including a horizontal support member 173a mainly formed of a bendable round bar material provided from right to left of the cabin roof 27, and an antenna fixing member 173b mainly formed of a bendable steel plate material.

A front camera 102 as an example of a first camera taking video of the front of the tractor 1 is attached to a front camera stay 102a in such a manner that it rotates up and down, and the front camera stay 102a is attached to the lower surface of the antenna fixing member 173b of the GPS antenna stay 173 that clamps the front center of the cabin roof 27 from the top and bottom. A rear camera 103 as an example of a second camera taking video of the rear of the tractor 1 is attached to a plate-like rear camera stay 103a, in such a manner that it rotates up and down, and the rear camera stay 103a is attached to the lower surface of the cabin roof 27 in the rear center of the cabin roof 27.

A video processing unit 104 processing the video of the front camera 102 and the rear camera 103 is attached to the rear of the operator's seat 10 in the cabin 26. An obstacle sensor 105 is provided in an opening 5a provided in the front of the hood 55, and radiates electromagnetic waves or ultrasonic waves toward the front to detect whether there is an obstacle in front of the tractor 1, and if there is, the distance to the obstacle.

Next to the steering wheel 8, a mobile terminal 106 such as a tablet terminal to manage work and set up the vehicle is provided. The mobile terminal 106 is also used as input means to input parameters when setting up a planned travel path P for automated driving.

A steering shaft (not illustrated) is provided below the steering wheel 8, and a steering motor 101 electronically controlling the steering is provided next to the steering shaft.

In the hood 55, an automated driving electronic control unit (ECU) 150 as an example of a control unit is provided, and the automated driving ECU 150 controls the engine 2 and the steering wheel 8 so that the machine travels along the planned travel path P, by comparing the planned travel path P with its own position calculated according to the positioning signal 31 received by the GPS antenna 174.

Figure 2:
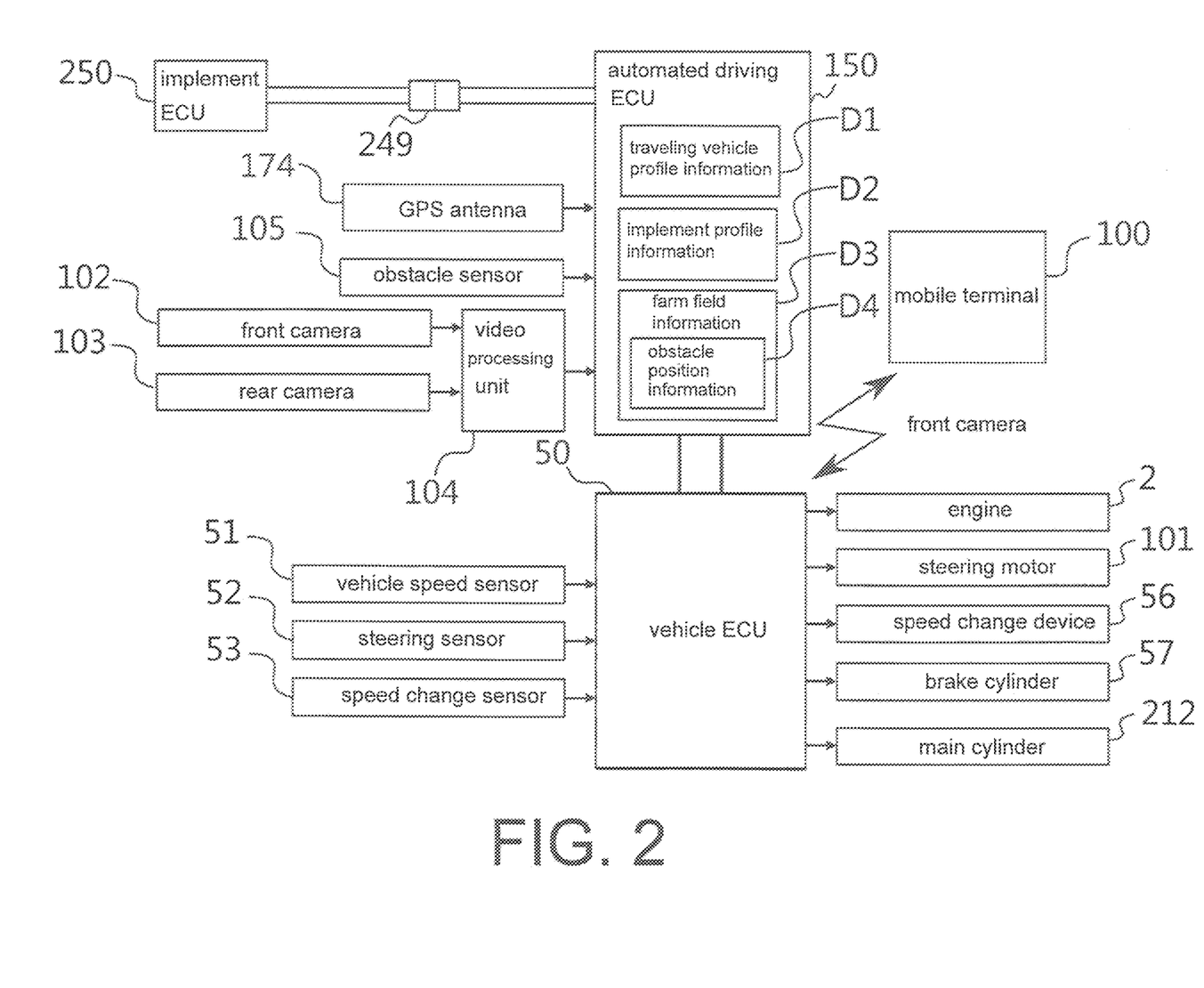
FIG. 2 illustrates a control block diagram.

FIG. 2 illustrates a control block diagram of the tractor 1. The tractor 1 includes a vehicle ECU 50 as a control unit controlling the traveling of the vehicle, and the automated driving ECU 150 processing position information according to the signal received by the GPS antenna 174, comparing the planned travel path P with its own position, and sending a control signal to the vehicle ECU 50.

To the vehicle ECU 50, signals are input from a vehicle speed sensor 51 detecting the vehicle speed, a steering sensor 52 detecting the steering angle of the front wheels 6, and a speed change sensor 53 detecting the position of the speed change. Signals output from the vehicle ECU 50 are a signal controlling the output of the engine 2, an operation signal of the steering motor 101 controlling the steering angle of the steering wheel 8, a speed changing signal of a speed change device 56, a braking signal sent to a brake cylinder 57 operating the brake to stop the traveling of the vehicle, and a lifting signal sent to the main cylinder 212 lifting up and down the implement 200.

The automated driving ECU 150 and the vehicle ECU 50 send and receive information to and from each other via wire communication, and control the vehicle depending on its position. Also, the automated driving ECU 150 is connected to an implement ECU 250 by means of an implement communication connector 249, and sends and receives information to and from it. The memory area of the implement ECU 250 stores implement identification information, and by obtaining the implement identification information, the automated driving ECU 150 recognizes the attached implement. The vehicle ECU 50 sends and receives information to and from the mobile terminal 106 via wireless communication, and displays the vehicle state or work conditions on a display of the mobile terminal 106.

The video taken by the front camera 102 and the rear camera 103 is input to the video processing unit 104 and processed, and if an obstacle is detected, information on the detected obstacle is input to the automated driving ECU 150. The obstacle sensor 105 detects obstacles by radiating a laser beam and receiving a reflected signal, and inputs an obstacle detection signal to the automated driving ECU 150.

The automated driving ECU 150 has traveling vehicle profile information D1 and implement profile information D2, and invokes, from the implement profile information D2, profile data that corresponds to the implement identification information obtained from the implement ECU 250 and applies it to the traveling vehicle profile information D1 to use for traveling to avoid the obstacle. The automated driving ECU 150 also has farm field information D3 on the shape, position, etc. of the farm field, and obstacle position information D4 that preliminarily stores the positions of obstacles in the farm field.

Figure 3:
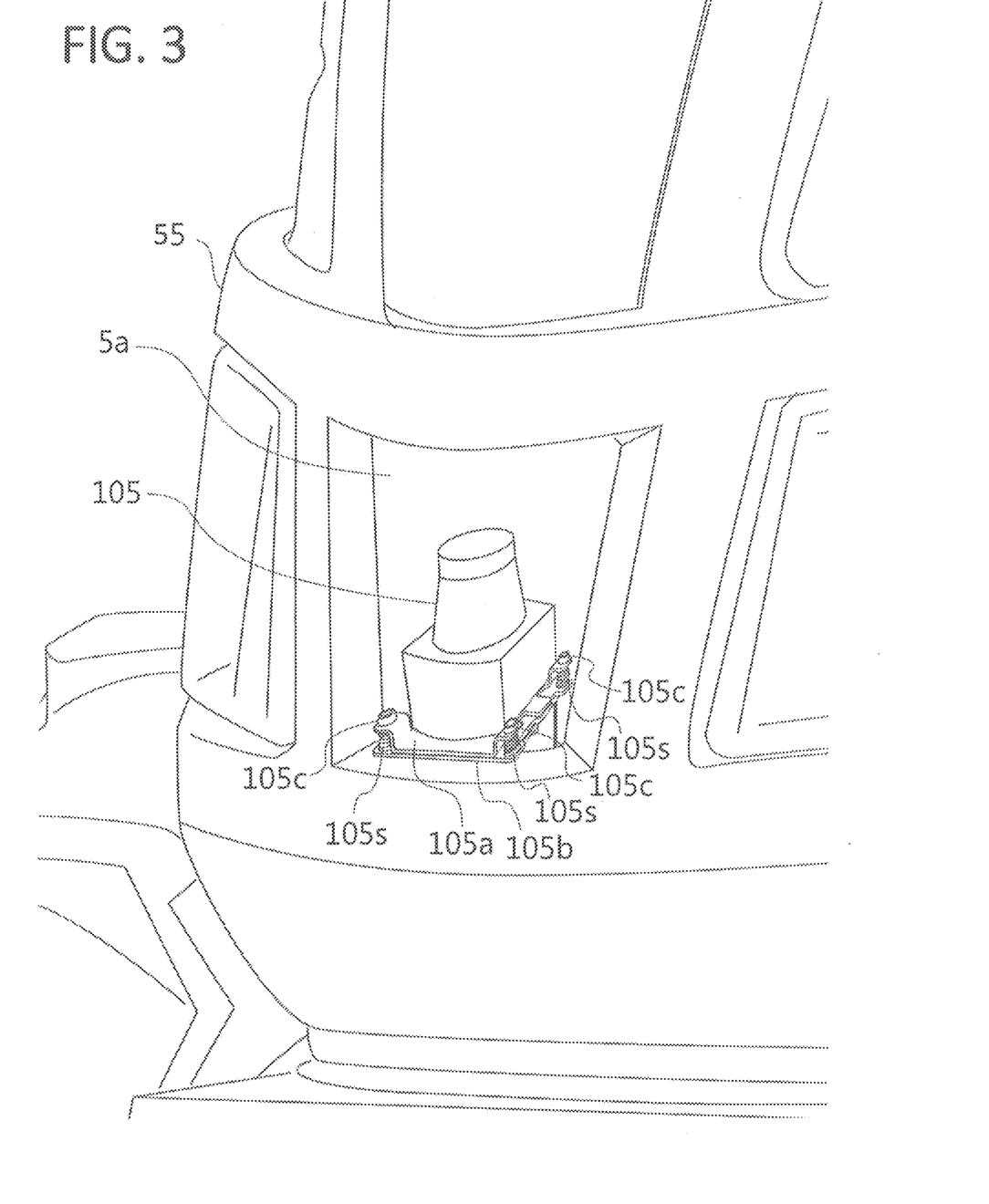
FIG. 3 illustrates schematic perspective view of the front of a hood.

FIG. 3 illustrates a schematic perspective view of the front of the hood 55 of the tractor 1. The obstacle sensor 105 is disposed in the opening 5a provided in the front of the hood 55. The obstacle sensor 105 is configured to detect the existence of an object and may be an infrared sensor, an ultrasonic-wave sensor or a millimeter-wave radar, for example. The obstacle sensor 105 is attached to an upper sensor attachment stay 105a, four corners of which are attached to a lower sensor attachment stay 105b fixed to the hood 55, by bolts 105c and springs 105s as an example of a resilient member. Since the vibrations of the engine, etc. are absorbed by the four springs 105s, the vibrations have a reduced effect when the obstacle sensor 105 detects an obstacle.

Figure 4:
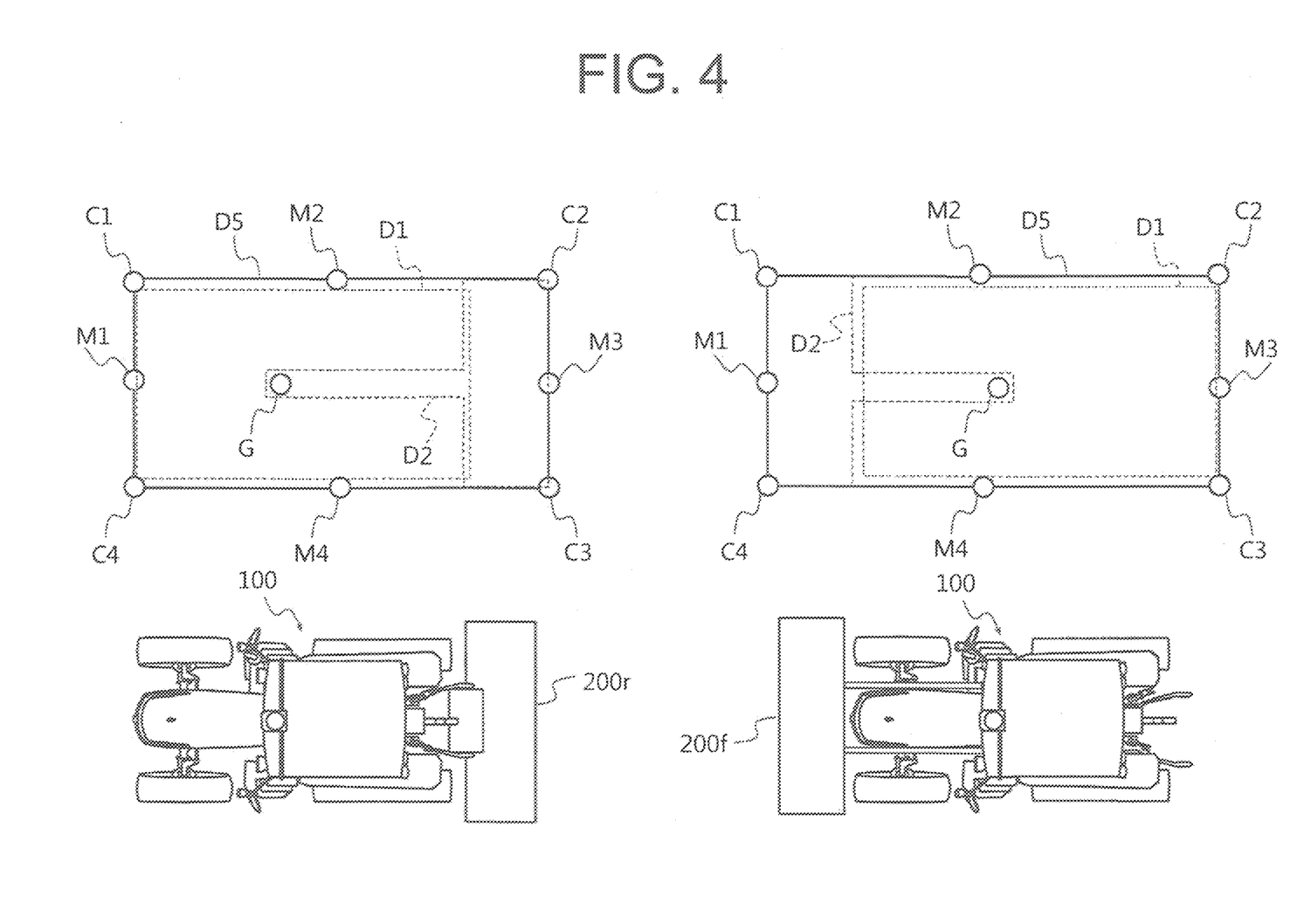
FIG. 4 illustrates a pattern diagram of tractor profile information with a different implement attached.

FIG. 4 illustrates a pattern diagram of tractor profile information of different implements attached. When an implement 200r is attached to the rear, the automated driving ECU 150 reads out the profile information of the implement 200r from the implement profile information D2 in plan view, and produces work vehicle profile information D5 that is profile information of the whole tractor 1 in plan view, corresponding to the rear of the traveling vehicle profile information D1 in plan view, for avoidance of obstacles.

The implement profile information D2 includes position information of the vehicle body 100 with respect to the GPS antenna 174, and the implement profile information D2 is added to the traveling vehicle profile information D1 with the precise position, with a GPS antenna position G of the traveling vehicle profile information D1 as the reference point. As a result, the work vehicle profile information D5 is produced for the whole tractor 1 in which an implement is attached to the vehicle body 100. At this time, the work vehicle profile information D5 is represented by nine points of four corners C1 to C4 of a rectangle that covers the whole work vehicle in plan view, four midpoints M1 to M4 therebetween, and the GPS antenna position G.

When an implement 200f is attached to the front of the vehicle, the automated driving ECU 150 reads out the profile information of the implement 200f from the implement profile information D2, and produces the work vehicle profile information D5 corresponding to the front of the traveling vehicle profile information D1, for avoidance of obstacles.

Figure 5:
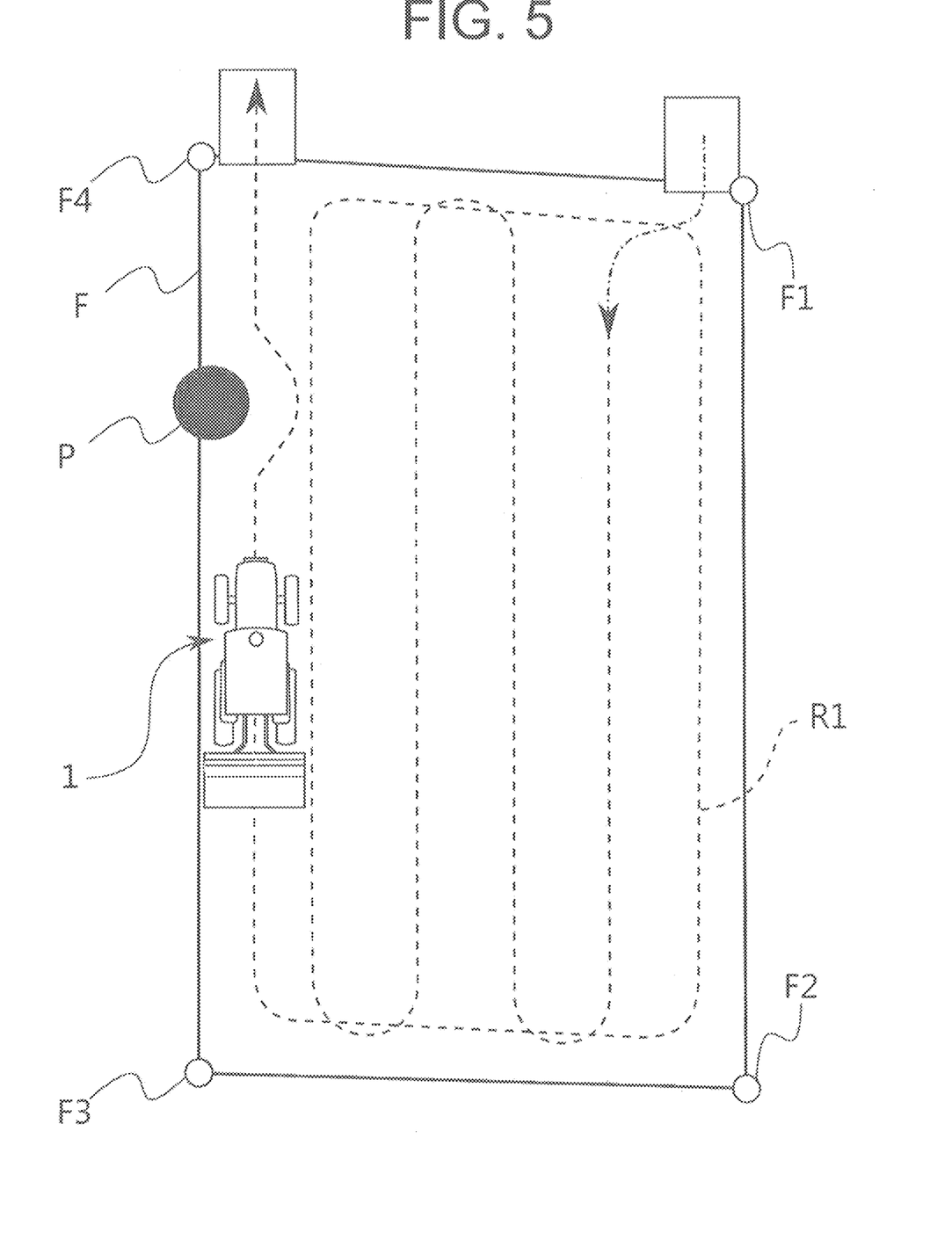
FIG. 5 illustrates a pattern diagram of a planned travel path for autonomous traveling.

FIG. 5 illustrates a pattern diagram of a planned travel path for autonomous traveling. Here, a planned travel path R is set for the tractor 1 to the rear of which a cultivating machine is attached for example to travel back and forth in the farm field F, and go out of the farm field at the end through the inner circumference of the farm field. Outer circumference points F1 to F4 determine the position and the shape of the farm field F, and are stored in the automated driving ECU 150 as the farm field information D3 (see FIG. 2). The farm field information D3 includes the obstacle position information D4 of an obstacle P, and the planned travel path R1 is set as a tentative course to avoid the obstacle P.

Figure 6:
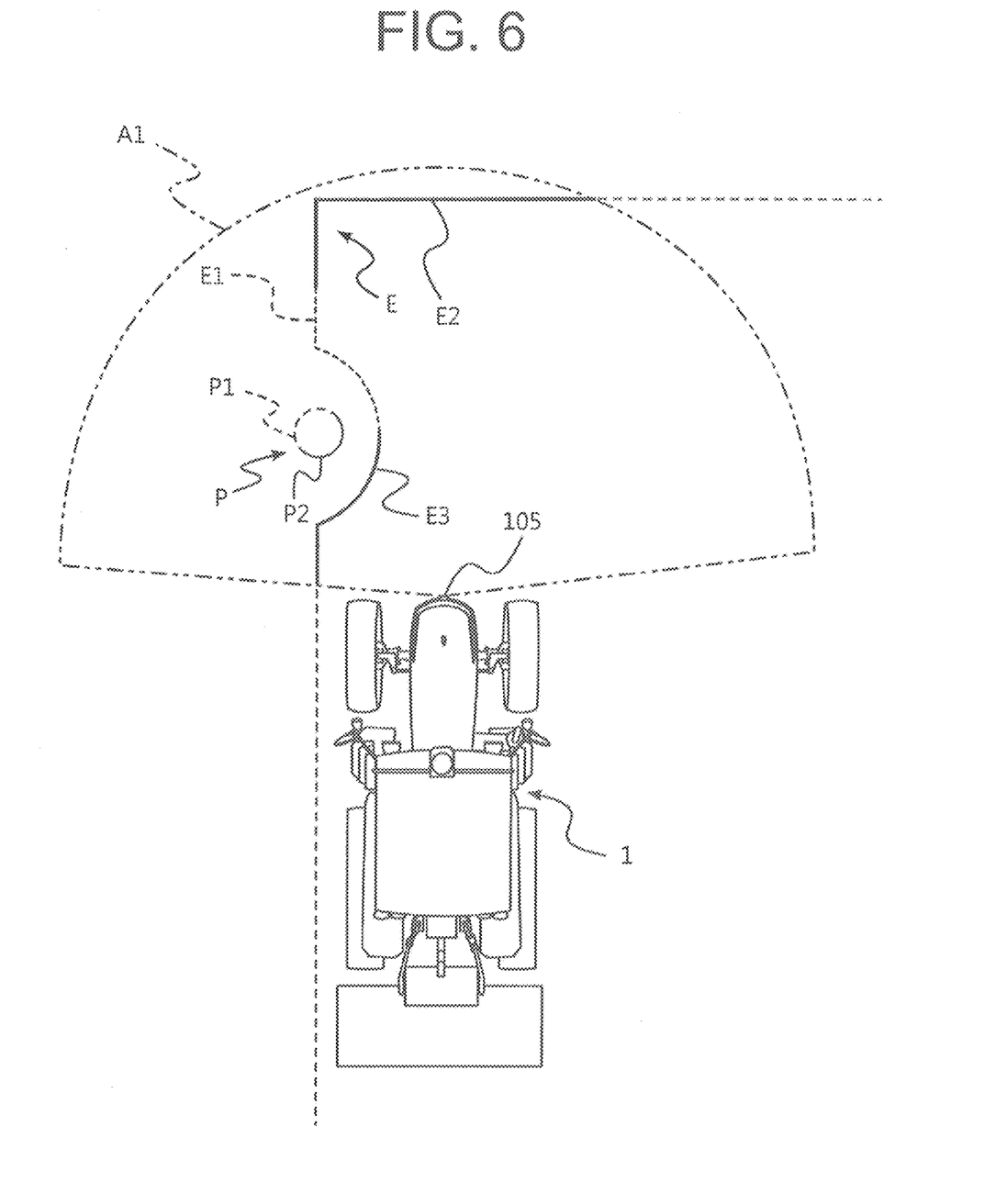
FIG. 6 illustrates a pattern diagram of obstacle detection.

FIG. 6 illustrates a pattern diagram of obstacle detection. The obstacle sensor 105 emits electromagnetic waves for example, and detects objects at a height or a higher position by detecting the reflected waves. In this way, in the radiation range A1 of the electromagnetic waves except blind areas P1, E1, the shapes of objects P2, E2, E3 and their relative positions to the vehicle are detected, and recognized by the automated driving ECU 150. The shapes of objects P2, E2, and E3 may be detected at a height thereof or a higher position.

Figure 7:
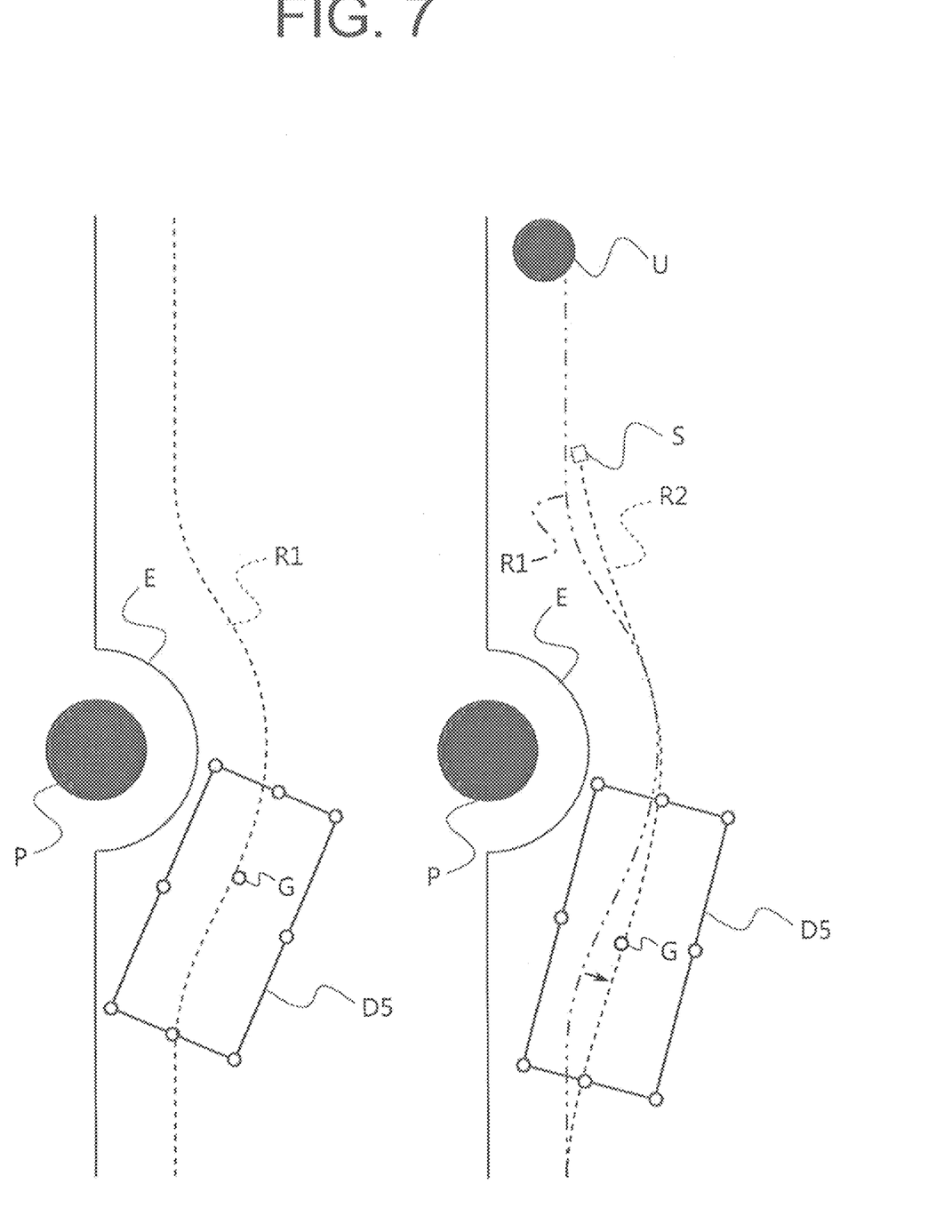
FIG. 7 illustrates a pattern diagram of avoidance traveling upon obstacle detection.

FIG. 7 illustrates a pattern diagram of avoidance traveling upon detection of an obstacle. When the tractor 1 autonomously travels with the GPS antenna position G moving along the tentative planned travel path R1, if the tractor 1 approaches a position stored in the obstacle position information D4, the vehicle is decelerated by speed change operation or by controlling the engine speed, and if the obstacle P or a ridge surface E detected by the obstacle sensor 105 does not interfere with the predicted position of the work vehicle profile information D5 sometime later (e.g., 10 seconds later), the tractor 1 is allowed to autonomously travel without changing the planned travel path R1. When reducing the speed as described here, the speed after the deceleration is preferably controlled with average values, etc. of vehicle speed or engine speed within some time before the deceleration as a reference.

In the tentative planned travel path R1, if the obstacle P or the ridge surface E detected by the obstacle sensor 105 interferes with the predicted position of the work vehicle profile information D5 sometime later (e.g., 10 seconds later), the planned travel path R1 is changed to an alternative travel path R2 by re-computing from the work vehicle profile information D5, to allow the tractor 1 to autonomously travel.

If the obstacle sensor 105 has detected an obstacle U that is not preliminarily set in the planned travel path R1, and if the predicted position of the work vehicle profile information D5 sometime later (e.g., 10 seconds later) interferes with it, the tractor 1 is stopped, for example at point S.

Figure 8:
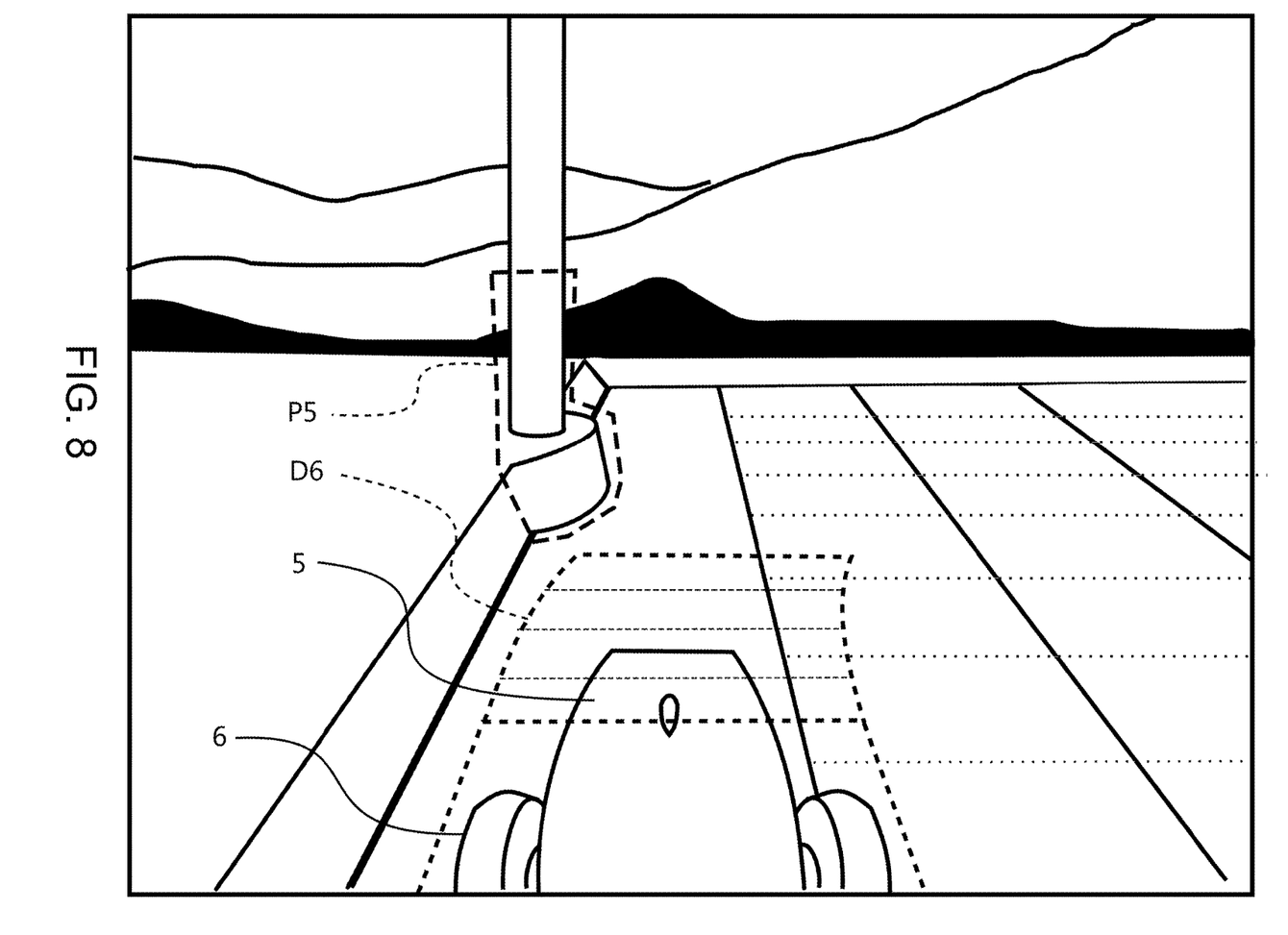
FIG. 8 illustrates a pattern diagram of an example of video taken by a front camera.

FIG. 8 illustrates a pattern diagram of an example of video taken by the front camera. In the example discussed above, the obstacles P, E, U may be detected by the obstacle sensor 105, but the present disclosure is not so limited. For example, an obstacle P5 may be detected by analyzing the video image taken by the front camera 102, and then superimposing a predicted position D6 of the work vehicle profile information D5 sometime later (e.g., 10 seconds later) on the camera's video to determine whether a line of the predicted position D6 intersects with the detected obstacle P5.

Figure 9:
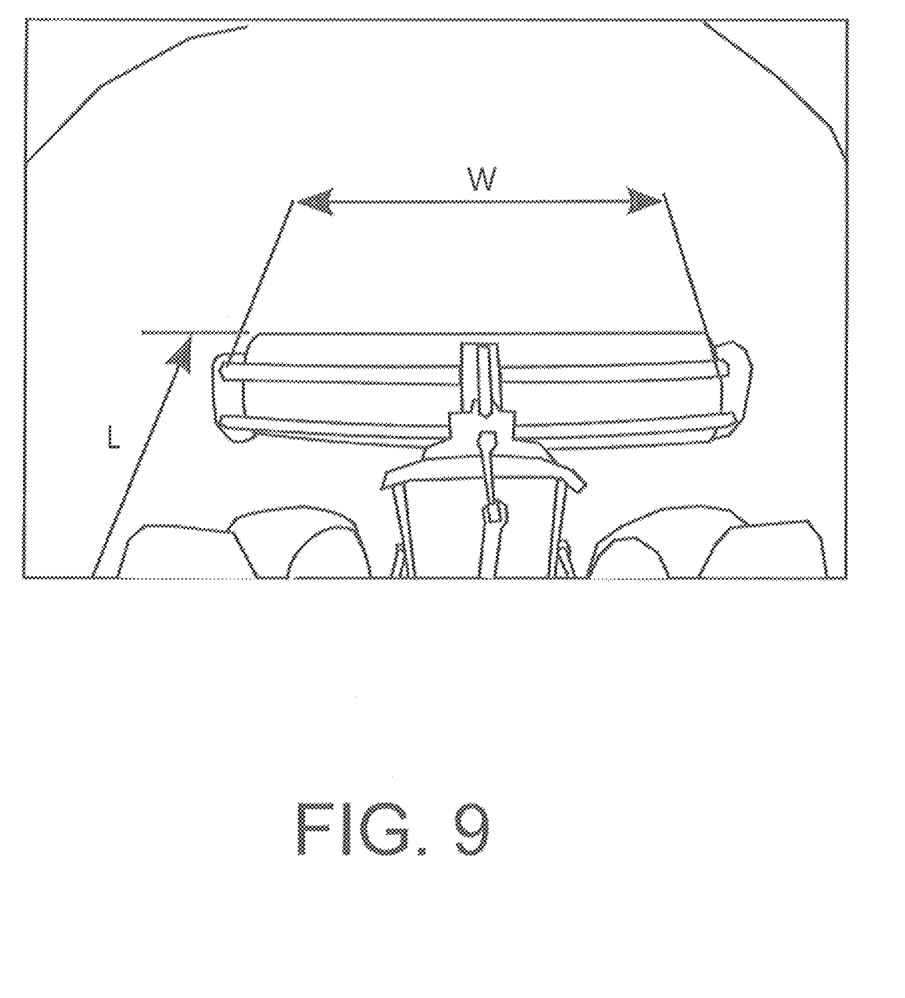
FIG. 9 illustrates a pattern diagram of an example of video taken by a rear camera.

FIG. 9 illustrates a pattern diagram of an example of video taken by the rear camera. In the example discussed above, the implement profile of the implement 200 including its width may be obtained from the implement profile information D2 stored in the automated driving ECU 150, but the present disclosure is not so limited. For example, a width W or a length L to the rear end of the attached implement 200 may be obtained by analyzing the video image taken by the rear camera 103.

Figure 10:
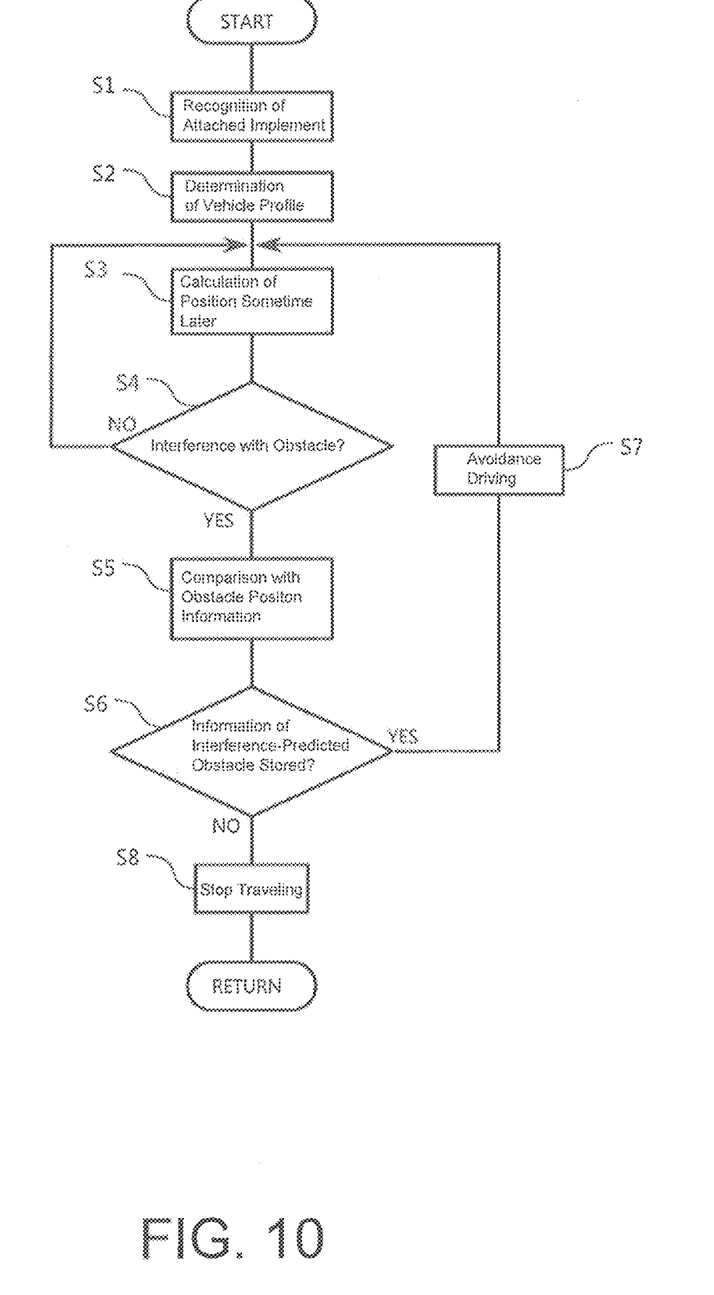
FIG. 10 illustrates a flowchart of control of autonomous driving.

FIG. 10 illustrates a flowchart of control of autonomous driving. When the autonomous driving is started, the implement 200 attached before the start of traveling is recognized by the automated driving ECU 150 (step S1). Upon recognition of the implement 200, the automated driving ECU 150 produces the work vehicle profile information D5 from the traveling vehicle profile information D1 and the implement profile information D2 (step S2).

According to the produced work vehicle profile information D5, a predicted position of the work vehicle profile information D5 sometime later is calculated for example from the traveling state including the speed, steering angle, etc. (step S3). The automated driving ECU 150 determines whether the obstacle (P, E, U) detected by the obstacle sensor 105 interferes with the calculated predicted position (step S4), and if there is no interference, traveling is continued while continuing to calculate predicted positions (returns to step S3).

If interference with an obstacle is predicted, the obstacle position information D4 preliminarily stored is referred to with respect to the position of the obstacle (P, E, U) detected by the obstacle sensor 105 (step S5), and it is determined whether the obstacle position information D4 includes the obstacle (step S6). If it does, avoidance driving is carried out (step S7), and the autonomous driving is continued (returns to step S3). If the obstacle has not been stored, the traveling by autonomous driving is stopped (step S8).

With the configurations described here, even when the different implements 200r, 200f are attached to the tractor 1, when running on the same travel trajectory R1, the tractor 1 recognizes the attached implement 200, and travels on a new travel path R2 by changing the travel path R1 corresponding to the implement 200, and therefore, even when the implements 200r, 200f of different shapes are attached, contact with the obstacles P, E is avoided in the autonomous traveling, and work is efficiently performed.

Also, the obstacles P, E are avoided while the machine recognizes the work vehicle profile information D5 of the attached implement 200 including the implement profile information D2, and therefore, even when the implements 200r, 200f of different shapes are attached, contact with the obstacles P, E is avoided in the autonomous traveling, and work is efficiently performed.

For the obstacle U that is not preliminarily expected, in consideration of unexpected contingency, the traveling is stopped at the point of time S, which may be a point when the contact is expected, to avoid contact with the obstacle U in the autonomous traveling.

Also, since the work vehicle profile information D5 is precisely calculated, even when the implements 200r, 200f of different shapes are attached, contact with the obstacles P, E, U may be avoided in the autonomous traveling, and work may be efficiently performed.

The tractor 1 of the configurations described here avoids contact with obstacles in the autonomous traveling, and work is efficiently performed.

EXPLANATION OF REFERENCE NUMERALS

1 tractor (work vehicle)
100 vehicle body
105 obstacle sensor (implement recognition means)
150 automated driving ECU (control unit)
174 GPS antenna (positioning device)
200 implement
D1 traveling vehicle profile information
D2 implement profile information
D4 obstacle position information
D5 work vehicle profile information
R1 planned travel path
E obstacle
G position of GPS antenna (positioning device)
P obstacle
U obstacle

What is claimed is:

1. A work vehicle comprising:
    a positioning device configured to receive a positioning signal sent from a plurality of satellites to measure a position of a body of the work vehicle;
    an obstacle sensor configured to detect an obstacle; and
    a control unit configured to control steering to cause the vehicle to autonomously travel on a planned travel path preliminarily set; wherein
    the control unit includes obstacle position information preliminarily stored; and
    while traveling on the planned travel path, when the obstacle is detected by the obstacle sensor, the control unit is configured to:
        perform avoidance driving to avoid contact with a first obstacle when it is determined that a corresponding position of the first obstacle is included in the stored obstacle position information; and
        stop the traveling when it is determined that a corresponding position of a second obstacle detected by the obstacle sensor is not included the stored obstacle position information.

2. The work vehicle of claim 1 wherein
    the control unit includes:
        traveling vehicle profile information, and
        implement profile information of an attached implement;
    the traveling vehicle profile information and the implement profile information include position information of the positioning device;
    with respect to a position of the positioning device, work vehicle profile information is calculated by adding the implement profile information to the traveling vehicle profile information; and
    according to the work vehicle profile information, an avoidance path is set to avoid contact with the obstacle.

3. The work vehicle of claim 2 wherein
    the control unit is configured to:
        calculate a predicted position of the work vehicle profile information of when the work vehicle autonomously travels in such a way that the position of the positioning device moves along the planned travel path preliminarily set; and
        when the predicted position interferes with the first obstacle, change the planned travel path, and set an alternative travel path in which the predicted position does not interfere with the work vehicle profile information.

* * * * *